Figure 1:
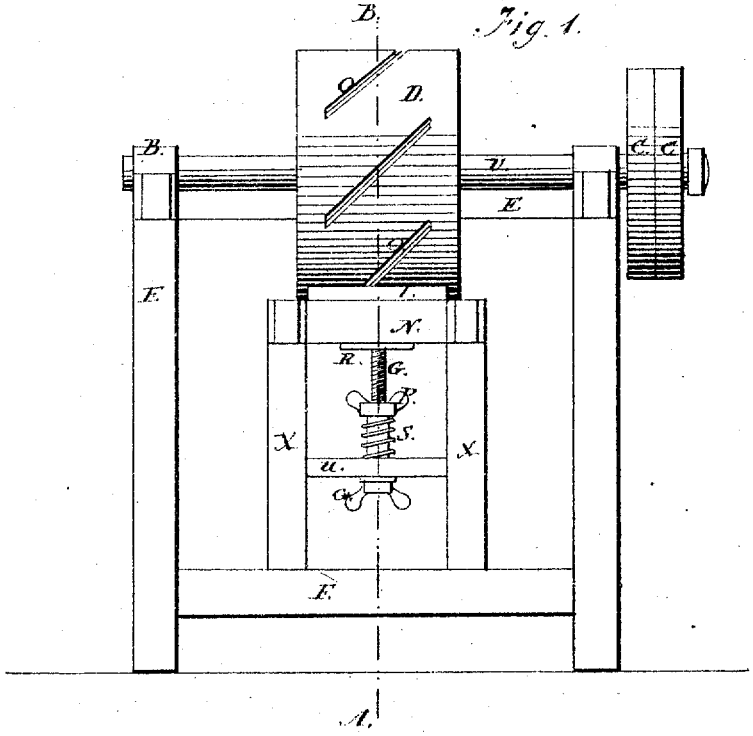

[57.]

ALBERT W. PRATT.

Improvement for Buffing, Whitening, Glossing, etc., for Leather.

No. 4,534. Reissued Aug. 29, 1871.

Attest:
Edw. W. Donn
H. Gardner.

Inventor:
Albert W. Pratt
by J. A. Bassett atty

AM. PHOTO-LITHOGRAPHIC CO. (N.Y.) (OSBORNE'S PROCESS.)

UNITED STATES PATENT OFFICE.

ALBERT W. PRATT, OF SALEM, MASSACHUSETTS, ASSIGNOR, BY MESNE ASSIGNMENTS, TO WILLIAM A. PERKINS.

IMPROVEMENT IN MACHINES FOR BUFFING, WHITENING, AND POLISHING LEATHER.

Specification forming part of Letters Patent No. 89,789, dated May 4, 1869; reissue No. 4,534, dated August 29, 1871.

*To all whom it may concern:*

Be it known that I, ALBERT W. PRATT, of Salem, in the county of Essex and State of Massachusetts, have invented a new and useful Improvement in Machine for Manufacturing Leather; and I do hereby declare the following to be a full, clear, and exact description of the same, reference being had to the drawing accompanying this specification and making part of the same.

Figure 2:
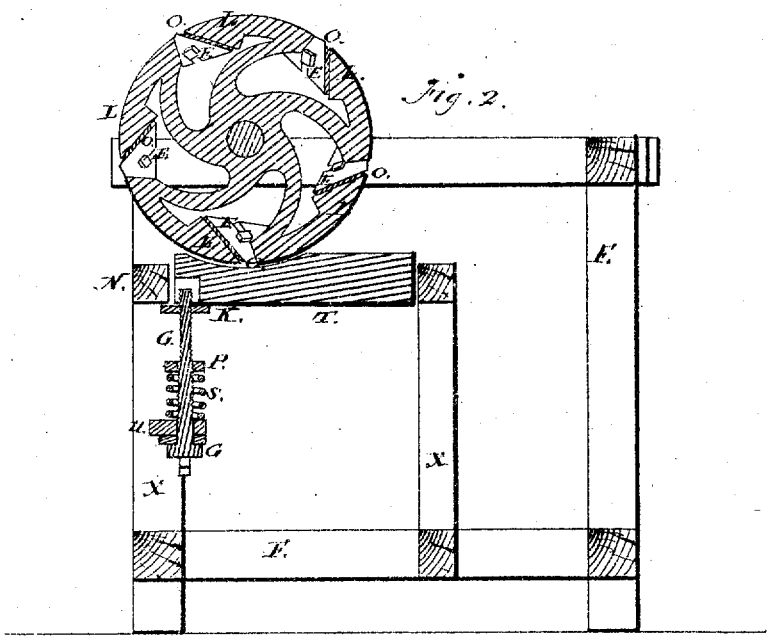

In the drawing, Figure 1 represents a front elevation of the machine. Fig. 2 is a longitudinal vertical section on the line A B, Fig. 1.

The object of my invention is to facilitate the different processes to which it can be applied, and to reduce the expenses incurred in the manufacture of leather. The nature of my invention consists in arranging a series of knives, steels, glasses, or other tools, in the periphery of a revolving wheel or cylinder, setting them at an angle to the shaft of said cylinder, and making the seat on which the tools are fastened at an acute angle with a tangent of the cylinder, projecting inward, and revolving said cylinder over an elastic bed, so arranged that it may be depressed, but is prevented from rising so high as to touch the cylinder.

To enable others skilled in the art to make and use my invention, I will proceed to describe its construction and operation.

In the drawing, F F represent the frame, made of wood or other suitable material. V represents a shaft, running in the boxes B, fastened rigidly to the frame. On the shaft V, and outside of the frame F, a tight and loose pulley, C C, are placed, to which power is applied by means of a belt. In the center, between the sides of the frame F, another pulley-wheel, D, is fastened to the shaft V. In the periphery of this wheel a series of slots, O O, is cut at an angle with the shaft V, and extending inward at an acute angle to a tangent of the wheels, forming a seat, L, on which are fastened the knives E and other tools used in the machine. The knives, steels, or glasses are formed flat and straight, with their edges rounded to fit the shape of the slot at the periphery. Underneath the pulley D are placed the standards X X, supporting a rectangular frame, N, which guides and supports the bed T. This bed, at the front end, rests on the bolt G and spring S. The other end is supported by a pivot on each side. The bolt G screws up through the nut K, by which the bed is raised or lowered to suit the varying thickness of the leather. The nut K is fastened to the bed, so as to prevent the bed rising only so high as needed. The bed is made more or less elastic in its action by compressing or loosening the spring S with the thumb-nut P. This spring S is supported by the bar U, fastened to the standards X X, and holds the bed and leather against the tools in the revolving cylinder D, and is prevented from lifting them too near the cylinder by the head of the bolt G coming against the under side of the bar U. By unscrewing the bolt G the bed is brought nearer the cylinder and the leather cut to the desired surface.

The manner of using my machine consists in giving the cylinder a rotary motion and placing the leather upon the bed under the wheel, and moving it about until the desired surface is obtained.

In the use of this machine for whitening and buffing leather the knives may be attached directly to the periphery of the cylinder in any suitable manner, and any desirable number of knives may be used; and, if required, the cylinder may be made to rotate at the end of a vibrating arm or pendulum, so as to reciprocate over the bed-plate, thus giving the knives a reciprocating as well as a rotary movement.

When I use the machine for glassing, polishing, or stoning out leather, a tool, of glass, steel, or other material is fastened to the tool-seat, which has a rounded edge curved to fit the periphery of the wheel, and set or adjusted so that the tool will extend out beyond the periphery of the wheel from one-sixteenth of an inch, more or less, as desired. The further the tool is set out the harder blow is given to the leather by the revolving tool, and by adjusting the blow to the thickness of the leather the leather is made soft and pliable at the same time it is polished or stoned.

The bed may be curved to conform to the cylinder for a longer or shorter distance, or may be used flat or rounded, as may be desired, in the different operations to which it can be applied.

The principal and most desirable use of this machine is for buffing and whitening leather. Machines are now in use which perform the operations of glassing and polishing, but no machine is in practical use which will satisfactorily whiten and buff leather; and in accomplishing this result the knives do not act so much as cutters as by their abrasive action, which, under a high speed of the cylinder, takes off a shaving in the form of dust, and leaves the leather in exactly the right condition.

In performing the various operations of glassing, polishing, or stoning out, the action of the machine upon the leather is entirely different from any machine now in use, particularly those machines in which a reciprocating arm carrying the tool is used. In those machines the tendency is to harden and compact the leather, which, for upper leather, is very undesirable. In this machine the action is to soften and make it more supple, and fit it better for making up and wearing.

I claim as my invention—

1. In a machine for whitening and buffing leather, a pulley or cylinder having one or more blades or tools, in which the cutting-plane is ground concentric with the axis of the cylinder.

2. In a machine for whitening and buffing leather, one or more blades or tools arranged in or upon a pulley or cylinder, the cutting-edge of which is ground parallel to the circle-plane of the pulley or cylinder upon which the knives are placed.

3. The process of whitening and buffing leather by means of knives or tools placed in or upon a cylinder, arranged and operated substantially as set forth and described.

4. In a machine for whitening and buffing leather, one or more knives or tools placed at an angle with the shaft of the cylinder in which the knives are placed.

5. In a machine for whitening and buffing leather, forming the seat to which the knives or tools are fastened at an acute angle with a tangent of the periphery of the cylinder projecting inward.

ALBERT W. PRATT.

Witnesses:
J. A. BASSETT,
WM. A. PERKINS.